United States Patent [19]

Hilton et al.

[11] Patent Number: 5,301,292

[45] Date of Patent: Apr. 5, 1994

[54] PAGE MODE COMPARATOR DECODE LOGIC FOR VARIABLE SIZE DRAM TYPES AND DIFFERENT INTERLEAVE OPTIONS

[75] Inventors: William K. Hilton, Phoenix; Albert J. Weidner, Tempe, both of Ariz.

[73] Assignee: VLSI Technology, Inc., San Jose, Calif.

[21] Appl. No.: 659,796

[22] Filed: Feb. 22, 1991

[51] Int. Cl.5 ............................................. G06F 12/00
[52] U.S. Cl. .................................................. 395/425
[58] Field of Search .............................. 395/400, 425; 365/230.03, 230.08, 238.5

[56] References Cited

U.S. PATENT DOCUMENTS 4,803,621 2/1989 Kelly .................................... 395/425
4,809,234 2/1989 Kuwashiro ......................... 395/425
4,924,375 5/1990 Fung et al. .......................... 395/425
5,051,889 9/1991 Fung et al. .......................... 395/425

Primary Examiner—Joseph L. Dixon
Assistant Examiner—Jack A. Lane
Attorney, Agent, or Firm—Harry M. Weiss

[57] ABSTRACT

Apparatus for decoding and comparing memory addresses which determines DRAM size and interleave options utilized is disclosed. A row address and bank select bits are decoded and latched and are subsequently compared with the address during the next memory cycle. If the next address matches the address stored in the latch, a "page hit" occurs and the memory cycle is shortened since the addresses during the consecutive memory address will differ only in the column address.

12 Claims, 4 Drawing Sheets

TABLE 1 - DRAM MEMORY MAPS SUPPORTED

| BANK 0 | BANK 1 | BANK 2 | BANK 3 | MEMORY MB | RAMMAP(4-0) |
|---|---|---|---|---|---|
| 256K | | | | (1.38) 1.00 | (1F*) 0 |
| 256K | 256K | | | (2.30) 2.00 | (1E*) 1 |
| 256K | 256K | 256K | | 3.00 | 2 |
| 256K | 256K | 256K | 256K | 4.00 | 3 |
| 1M | | | | 4.00 | 4 |
| 256K | 1M | | | 5.00 | 5 |
| 256K | 256K | 1M | | 6.00 | 6 |
| 1M | 1M | | | 8.00 | 7 |
| 1M | 1M | 256K | | 9.00 | 8 |
| 256K | 256K | 1M | 1M | 10.00 | 9 |
| 1M | 1M | 1M | | 12.00 | A |
| 1M | 1M | 1M | 1M | 16.00 | B |
| 4M | | | | 16.00 | C |
| 256K | 4M | | | 17.00 | D |
| 256K | 256K | 4M | | 18.00 | E |
| 1M | 4M | | | 20.00 | F |
| 1M | 1M | 4M | | 24.00 | 10 |
| 4M | 4M | | | 32.00 | 11 |
| 4M | 4M | 256K | | 33.00 | 12 |
| 256K | 256K | 4M | 4M | 34.00 | 13 |
| 4M | 4M | 1M | | 36.00 | 14 |
| 1M | 1M | 4M | 4M | 40.00 | 15 |
| 4M | 4M | 4M | | 48.00 | 16 |
| 4M | 4M | 4M | 4M | 64.00 | 17 |

* 1E AND 1F ARE SPECIAL CASE MEMORY MAPS.

fig. 1

| SIZE DRAM | 256KG | | | 1MB | | | | | 4MB | | | | |
|---|---|---|---|---|---|---|---|---|---|---|---|---|---|
| TYPE MAP | NONE 2W/b 4W/b | 2W/W | 4W/W | NONE | 2W/b | 2W/W | 4W/b | 4W/W | NONE | 2W/b | 2W/W | 4W/b | 4W/W |
| S2 | 13 | 13 | 13 | 13 | 13 | 13 | X | X | 13 | X | X | X | X |
| S1 | 12 | 12 | 3 | 12 | X | X | 12 | 3 | X | X | X | 12 | 3 |
| S0 | 11 | 2 | 2 | X | 11 | 2 | 11 | 2 | X | 11 | 2 | 11 | 2 | fig. 3

CPU ADDRESS TO MEMORY ADDRESS TRANSLATIONS

| | | 256K | | | | 1M | | | | 4M | | | MEM ADD |
|---|---|---|---|---|---|---|---|---|---|---|---|---|---|
| | NONE | 2WAY BLOCK | 2WAY WORD | 4WAY BLOCK | 4WAY WORD | NONE | 2WAY BLOCK | 2WAY WORD | 4WAY BLOCK | 4WAY WORD | NONE | 2WAY BLOCK | 2WAY WORD | 4WAY BLOCK | 4WAY WORD | |
| COLUMN ADDRESS | 4 | 4 | 4 | 4 | 4 | 4 | 4 | 4 | 4 | 4 | 4 | 4 | 4 | 4 | 4 | 0 |
| | 5 | 5 | 5 | 5 | 5 | 5 | 5 | 5 | 5 | 5 | 5 | 5 | 5 | 5 | 5 | 1 |
| | 6 | 6 | 6 | 6 | 6 | 6 | 6 | 6 | 6 | 6 | 6 | 6 | 6 | 6 | 6 | 2 |
| | 7 | 7 | 7 | 7 | 7 | 7 | 7 | 7 | 7 | 7 | 7 | 7 | 7 | 7 | 7 | 3 |
| | 8 | 8 | 8 | 8 | 8 | 8 | 8 | 8 | 8 | 8 | 8 | 8 | 8 | 8 | 8 | 4 |
| | 9 | 9 | 9 | 9 | 9 | 9 | 9 | 9 | 9 | 9 | 9 | 9 | 9 | 9 | 9 | 5 |
| | 10 | 10 | 10 | 10 | 10 | 10 | 10 | 10 | 10 | 10 | 10 | 10 | 10 | 10 | 10 | 6 |
| | 2 | 2 | 2 | 2 | 2 | 2 | 2 | 2 | 2 | 2 | 2 | 2 | 2 | 2 | 2 | 7 |
| | 3 | 3 | 3 | 3 | 3 | 3 | 3 | 3 | 3 | 3 | 3 | 3 | 3 | 3 | 3 | 8 |
| | - | - | - | - | - | 11 | 11 | 12 | 12 | 13 | 11 | 12 | 12 | 13 | 13 | 9 |
| | - | - | - | - | - | - | - | 12 | 12 | 13 | 12 | 13 | 13 | 14 | 14 | 10 |

CA[10:0] THESE ARE DRIVING MA[10:0] DURING CAD

| | | 256K | | | | 1M | | | | 4M | | | |
|---|---|---|---|---|---|---|---|---|---|---|---|---|---|
| ROW ADDRESS | 19 | 19 | 19 | 19 | 19 | 19 | 19 | 19 | 19 | 19 | 19 | 19 | 19 | 19 | 19 | 0 |
| | 18 | 18 | 18 | 18 | 18 | 18 | 18 | 18 | 18 | 18 | 18 | 18 | 18 | 18 | 18 | 1 |
| | 17 | 17 | 17 | 17 | 17 | 17 | 17 | 17 | 17 | 17 | 17 | 17 | 17 | 17 | 17 | 2 |
| | 16 | 16 | 16 | 16 | 16 | 16 | 16 | 16 | 16 | 16 | 16 | 16 | 16 | 16 | 16 | 3 |
| | 15 | 15 | 15 | 15 | 15 | 15 | 15 | 15 | 15 | 15 | 15 | 15 | 15 | 15 | 15 | 4 |
| | 14 | 14 | 14 | 14 | 14 | 14 | 14 | 14 | 14 | 14 | 14 | 14 | 14 | 25 | 25 | 5 |
| | 13 | 13 | 13 | 13 | 13 | 13 | 13 | 13 | 13 | 23 | 23 | 23 | 23 | 23 | 23 | 6 |
| | 12 | 12 | 12 | 12 | 12 | 12 | 12 | 21 | 21 | 21 | 21 | 21 | 21 | 21 | 21 | 7 |
| | 11 | 11 | 20 | 20 | 20 | 20 | 20 | 20 | 20 | 20 | 20 | 20 | 20 | 20 | 20 | 8 |
| | - | - | - | - | - | - | - | 22 | 22 | 22 | 22 | 22 | 22 | 22 | 22 | 9 |
| | - | - | - | - | - | 21 | 21 | - | - | - | 24 | - | - | 24 | 24 | 10 |

RA[10:0] THESE DRIVE MA[10:0] DURING RAS

| BANK SELECTS | 20 | 11 | 11 | 11 | 11 | 22 | 11 | 11 | 11 | 11 | 24 | 11 | 11 | 11 | 11 |
| | - | - | - | 12 | 12 | - | - | - | 12 | 12 | - | - | - | 12 | 12 |

| BANK ENABLE DECODES | 21 | 21 | 21 | 22 | 22 | - | - | - | - | - | - | - | - | - | - |
| | 22 | 22 | 22 | 23 | 23 | 23 | 23 | 23 | 24 | 24 | - | - | - | - | - |
| | 23 | 23 | 23 | 24 | 24 | 24 | 24 | 24 | 25 | 25 | - | - | - | 24 | 25 |
| | 24 | 24 | 24 | 25 | 25 | 25 | 25 | 25 | - | - | 25 | 25 | 25 | 25 | - |
| | 25 | 25 | 25 | - | - | - | - | - | - | - | - | - | - | - | - |

THESE DO NOT DRIVE OUT BUT ARE DECODED INTERNALLY TO SELECT THE PROPER BANKS.

fig. 2

PAGE MODE COMPARATOR DECODE LOGIC FOR VARIABLE SIZE DRAM TYPES AND DIFFERENT INTERLEAVE OPTIONS

TECHNICAL FIELD

The present invention relates, in general, to the memory associated with a digital computer and, more particularly, to a memory accessing system for such a computer.

BACKGROUND ART

Memories in digital computers usually include a plurality of banks of dynamic random access memory (DRAM) chips. For example, a 80386DX system controller can support four banks of DRAMs, each comprising three (3) DRAM sizes. In addition, the foregoing system controller can support twenty-five (25) different memory map options, and many of the memory map options involve mixed DRAM sizes. Furthermore, the foregoing controller can also support both word and block interleaving techniques for pairs of like size banks of DRAMs. In addition, the concept of page mode can be introduced into the foregoing system. Using page mode techniques, at the end of a memory cycle, the address bits which access the row and the bankselect are latched. During the next memory access, the latched address bits are compared to the new address bits and if the addresses match, a "page hit" occurs and the memory cycle is shortened. The concept of combining interleaving and page mode techniques has been attempted, however, variable DRAM sizes were not involved. For example, U. S. Pat. No. 4,924,375 discloses the concept of combining page mode and interleaving techniques, but the DRAM sizes are the same in each pair of banks. This utilization of DRAMs of the same size in each pair of banks presents a limitation in the foregoing system.

In view of the foregoing, it has become desirable to develop apparatus for facilitating page mode operations in a wide variety of memory map options, including variable size DRAMs, and different interleaving options.

SUMMARY OF THE INVENTION

The present invention solves the problems associated with the prior art and other problems by providing an address decoding and comparing technique for use in computer memories utilizing a plurality of banks of DRAMs, each bank comprising different DRAM sizes and arranged to support a multiplicity of memory map options utilizing interleaving and page mode techniques by providing a page mode comparator register for each DRAM bank. The row addresses and bank enable bits are decoded and latched for one of the four banks of DRAMs and are subsequently compared with the address on the next memory cycle. If the next address matches the address retained in the latch, a "page hit" occurs and the memory cycle is shortened since the addresses during the consecutive memory address will differ only in the column address. The present invention provides the necessary decode and compare logic to produce the address bits which are required in the foregoing system when page mode techniques are introduced and different DRAM sizes are involved.

BRIEF DESCRIPTION OF THE DRAWINGS

FIG. 1 is Table 1 which illustrates the memory map options.

FIG. 2 is Table 2 which illustrates the CPU address to memory address translations.

FIG. 3 is Table 3 which illustrates the possibilities of address bits 11, 12 and 13.

DESCRIPTION OF THE PREFERRED EMBODIMENT

Figure 4:
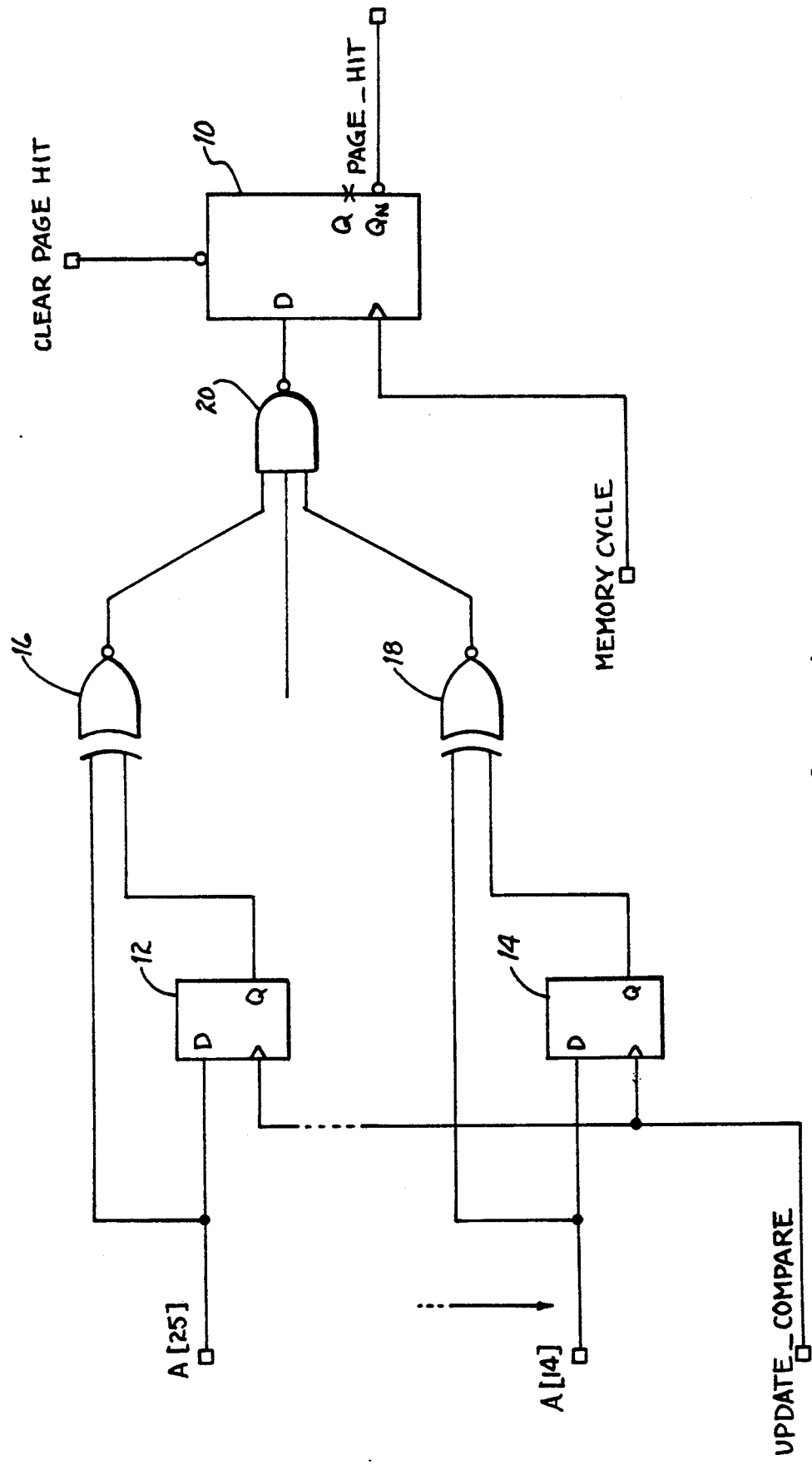
FIG. 4 is a diagram of the logic utilized by the prior art approaches of comparing the current address with an earlier address.

In complex computer memory systems, generation of the memory address lines is very involved. For example, a 80386DX system controller chip supports features which makes generation of a memory addresses quite difficult. The foregoing controller can support three (3) sizes of DRAMs, each requiring a different number of address lines. In addition, the foregoing controller can support up to four banks of DRAMs. Furthermore, twenty-five (25) different memory map options are available, and many of the memory map options support mixing different DRAM sizes, for example, see Table 1 for memory map options supported. The foregoing controller also supports both word and block interleaving for pairs of like size DRAMs. Interleaving is a technique where consecutive memory addresses can go to different banks of DRAMs, allowing sufficient time between same bank accesses so that slower access memories can be used with minimal performance penalties. In word interleaving, the interleave occurs on CPU address bit 2. In block interleaving, the interleave occurs on CPU address bit 11. Three of the memory map options shown in Table 1 of FIG. 1 support four banks of like size DRAMs (options 3, B and 17) and four-way interleaving can occur with word interleaving based on CPU address bits 2 and 3 and block interleaving based on CPU address bits 11 and 12. Table 2 of FIG. 2 illustrates which address bits get multiplexed out to the banks of DRAMs as column address (CA) and row address (RA) lines for all combinations of DRAM sizes and interleaving options.

The present invention extends the concept of page mode to systems utilizing complex interleaving options and different size DRAMs. The principle upon which page moding is based is that at the end of a memory cycle, the address bits which access the row and bankselect are latched. During the next memory access, the latched address bits are compared to the new address bits, and if the address bits match, a "page hit" occurs and the memory cycle is shortened. In essence, a "page hit" occurs if the addresses during consecutive memory accesses differs only in their column addresses. The combination of page mode techniques with interleaving techniques results in the best possible combination of fast system memory operation using the most cost effective DRAMs. However, the use of page mode techniques in conjunction with interleaving techniques for different sizes of DRAMs in a plurality of DRAM banks and which can support twenty-five (25) different memory options creates a very complex memory structure since the storing and comparing of the addresses is affected by the time required for interleaving and the size DRAMs utilized.

The present invention utilizes four independent page compare registers, one for each DRAM bank. Only the page compare register associated with the DRAM bank containing the current address is updated on a memory access. Address bits A [25:14] are always stored However, depending upon the type of interleaving utilized and the size of DRAMs involved, one to three additional bits must be stored. These bits can be any of A [13, 12, 11, 3, 2]. Table 3 of FIG. 3 illustrates all of the possibilities for which three of the five bits need to be stored.

In the above Table:

"S2, S1, S0" refer to the stored bits.

"None" means no interleaving, implying a single bank or mismatched bank.

"2 w/b" means two-way block interleaving (interleave on A [11]).

"2 w/w" means two-way word interleaving (interleave on A [2]).

"4 w/b" means four-way block interleaving (interleave on A [12:11]).

"4 w/w" means four-way word interleaving (interleave on A [3:2]). "X" means store Vdd, which takes that bit out of the compare since a comparison of Vdd to Vdd would occur and always results in a match.

Referring now to the drawings, FIG. 4 depicts the logic utilized by the prior art approaches of comparing the current address with the earlier latched address to generate a "page hit". This Figure illustrates one of four page registers, one register for each bank of DRAM. Initially, the "QN" output of latch 10, the "page hit" signal, is set to a logic low by setting the latch 10 with the "clear page hit" signal. Latch 10 is transparent during each memory cycle, that is, the input "D" passes through to the output "Q".

If the current memory cycle addresses a bank of DRAM, then the latches associated with that bank of DRAM store the necessary address bits in a plurality of latches 12, ..., 14. The total number of latches depends on the size of the DRAM, as illustrated in Table 2. These latched address bits define the row and bank that are accessed by the current memory cycle. If a subsequent memory access is to the same row and bank of DRAM occurs, then both inputs to each exclusive NOR gate 16 and 18 (and all other exclusive NORs associated with the latches, not shown) will be the same, and the output of each exclusive NOR gate 16 and 18 will be logic "1" resulting in the output of the NAND gate 20 being a logic low, thus forcing the "QN" output of latch 10 high causing a "page hit" to occur. If any of the stored address bits differ from the current address bits, its associated exclusive NOR gate will be a logic low, forcing the NAND gate 20 high and the "QN" output of latch 10 low, signalling no page hit.

Figure 5:
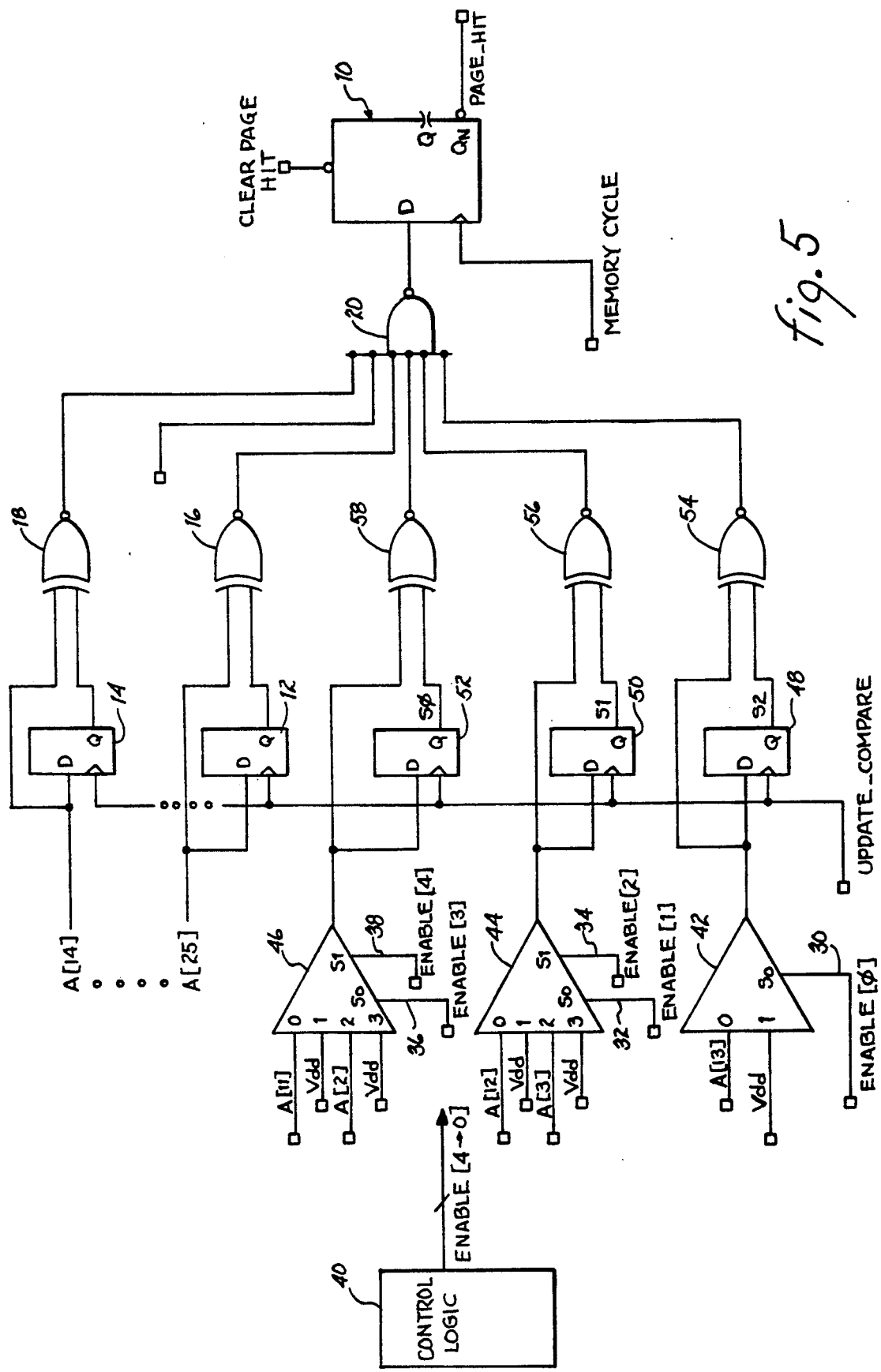
FIG. 5 is a diagram of the logic utilized by the present invention.

The present invention provides a hardware solution to the difficulties encountered when a system supports complex memory maps utilizing different size DRAMs and different interleaving options. Referring now to FIG. 5 which depicts the logic for each bank of dram, utilized by the present invention and expanding upon the prior art of a page mode comparator, a total of five select or "enable" lines 30, 32, 34, 36 and 38 are the output from a logic block 40 entitled control logic for each comparator utilize appropriate bank of DRAM. These enable lines depend upon which of the (25) memory map options from Table 1 is being used and which interleave option (two or four way, word or byte) is being used. The enable lines are input into a plurality of multiplexers (muxes) 42, 44 and 46. These enable lines control the determination as to which address bits 13, 12, 11, 3 and 2, are multiplexed (muxed) out to three additional latches shown as latches 48, 50 and 52. Table 3 indicates which address bits are muxed out to the foregoing latches depending on the dram size and interleaving type associated with a particular bank of memory. During a current memory cycle, the enable controlled muxed address bits are latched into the appropriate latch, i.e., latches 48, 50 and 52. On a subsequent memory access, the enable controlled muxed address bits are compared to the latched bits by the associated exclusive NOR gates 54, 56 and 58. If these bits match, the output of the associated exclusive NOR gate will be a logic "1" which can be applied to the input of NAND gate 20 of FIG. 5. These outputs of the exclusive NOR gates 54, 56 and 58 operate in conjunction with the exclusive NOR gate compare of address line A [25:14]which are also an input to the NAND gate. If these inputs to the NAND gate are all logic "1"'s, the output of the NAND gate will be a logic low, thus forcing the "QN" output of latch 10 of FIG 5 high causing a "page hit" to occur. If any of the stored bits differ from the current address bits, the output of the associated exclusive NOR gate will be a logic low, forcing the output of NAND gate to go high causing the "QN" output of the page hit latch to be driven low, signalling no page hit.

For example, with respect to the matter of storing address bits A [13, 12, 11, 3 and 2] or Vdd, and, in particular with respect to storing muxed address bits A [3], A [12] or Vdd. referring to Table 3 and FIG. 2 of the drawings, the following conditions dictate which of the muxed address bits are stored. Vdd is stored for 1 Mbyte DRAMs with two-way interleaving, and 4 Mbyte DRAMs with no interleaving or two-way interleaving. A [3] is stored for 256 Kbyte or 1 Mbyte or 4 Mbyte DRAMs, all with four-way word interleaving. A [12] is stored for all of the remaining conditions, i.e., 256 Kbyte DRAMs, no interleaving; 256 Kbyte DRAMs, two-way interleaving; 256 Kbyte DRAMs, four-way block interleaving; 1 Mbyte DRAMs, no interleaving; 1 Mbyte DRAMs, four-way block interleaving; and 4 Mbyte DRAMs, four-way block interleaving.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. In a computer system containing a plurality of dynamic random access memories of different sizes, a page hit mode detection system for providing both two way and four way interleaving and word type and byte type interleaving comprising, in combination:

control logic means containing memory map configuration data and interleaving option data stored therein for providing an output on each of a plurality of enable signal lines;

first latch means couples to a first plurality of address lines of a portion of said plurality of dynamic random access memories for storing a plurality of first address signals that are applied to said first plurality of address lines;

multiplexer means coupled to a second plurality of address lines of another portion of said plurality of dynamic random access memories and to said enable signal lines of said control logic means for providing a plurality of multiplexed address signals in response to said output on each of said plurality of signal lines;

second latch means coupled to outputs of said multiplexer means for storing a plurality of multiplexed signals, said first and second latch means being connected to an input signal line having an update compare signal thereon, said first plurality of address signals and said multiplexed address signals being stored within said first and second latch means, respectively, in response to said update-compare signal;

comparing means coupled to said first and second latch means, said first plurality of address lines, and to said multiplexer means for providing a comparison output signal which is dependent upon inputs to said comparison means; and page hit means coupled to said comparing means and a signal line that provides a memory cycle signal for generating an output page hit signal in response to said inputs to said comparing means.

2. The system of claim 1 wherein said comparing means includes EXCLUSIVE-NOR means for providing said comparison output signal.

3. The system of claim 2 wherein said EXCLUSIVE-NOR means includes an EXCLUSIVE-NOR gate.

4. The system of claim 3 wherein said comparison means comprises a NAND gate coupled to said page hit means.

5. The system of claim 4 wherein said page hit means includes a page-hit latch having a pair of inputs respectively connected to an output of said NAND gate and to said memory cycle signal line, an output of said page hit latch providing said output page-hit signal.

6. The system of claim 5 wherein a clear page-hit signal line is connected to said page hit latch, said page hit latch being cleared in response to a clear signal being provided on said clear page-hit signal line.

7. A method of providing in a computer system containing a plurality of dynamic random access memories of different sizes, a page hit mode detection system for providing both two way and four way interleaving and word type and byte type interleaving comprising the steps of:

providing control logic means containing memory map configuration data and interleaving option data stored therein for providing an output on each of a plurality of enable signal lines;

providing first latch means coupled to a first plurality of address lines of a portion of said plurality of dynamic random access memories for storing a plurality of first address signals that are applied to said first plurality of address lines;

providing multiplexer means coupled to a second plurality of address lines of another portion of said plurality of random access memories and to said enable signal lines of said control logic means for providing a plurality of multiplexed address signals in response to said output on each of said plurality of signal lines;

providing second latch means coupled to outputs of said multiplexer means for storing a plurality of multiplexed signals, said latch means being connected to an input signal line having an update compare signal thereon, said first plurality of address signals and said multiplexed address signals being stored within said first and second latch means, respectively, in response to said update-compare signal; and providing comparing means coupled to said first and second latch means, said first plurality of address lines, and to said multiplexer means for providing a comparison output signal which is dependent upon inputs to said comparison means; and providing page hit means coupled to said comparing means and a signal line that provides a memory cycle signal for generating an output page hit signal in response to said inputs to said comparing means.

8. The method of claim 7 wherein said comparing means includes EXCLUSIVE-NOR means for providing said comparison output signal.

9. The method of claim 8 wherein said EXCLUSIVE-NOR means includes an EXCLUSIVE-NOR gate.

10. The method of claim 9 wherein said comparison means comprises a NAND gate coupled to said page hit means.

11. The method of claim 10 wherein said page hit means includes a page-hit latch having a pair of inputs respectively connected to an output of said NAND gate and to said memory cycle signal line, an output of said page hit latch providing said output page-hit signal.

12. The method of claim 11 wherein a clear page-hit signal line is connected to said page hit latch, said page hit latch being cleared in response to a clear signal being provided on said clear page-hit signal line.

* * * * *